(12) United States Patent
Fujihara

(10) Patent No.: US 12,268,968 B2
(45) Date of Patent: Apr. 8, 2025

(54) INFORMATION PROCESSING DEVICE AND IMAGE DISTRIBUTION METHOD

(71) Applicant: Sony Interactive Entertainment Inc., Tokyo (JP)

(72) Inventor: Masahiro Fujihara, Tokyo (JP)

( * ) Notice: Subject to any disclaimer, the term of this patent is extended or adjusted under 35 U.S.C. 154(b) by 324 days.

(21) Appl. No.: 17/909,461

(22) PCT Filed: Mar. 19, 2021

(86) PCT No.: PCT/JP2021/011301
§ 371 (c)(1),
(2) Date: Sep. 6, 2022

(87) PCT Pub. No.: WO2021/193400
PCT Pub. Date: Sep. 30, 2021

(65) Prior Publication Data
US 2023/0110447 A1 Apr. 13, 2023

(30) Foreign Application Priority Data
Mar. 26, 2020 (JP) ................................ 2020-056771

(51) Int. Cl.
*A63F 13/25* (2014.01)
*A63F 13/35* (2014.01)
(Continued)

(52) U.S. Cl.
CPC .............. *A63F 13/86* (2014.09); *A63F 13/35* (2014.09); *A63F 13/812* (2014.09); *A63F 2300/577* (2013.01); *A63F 2300/8011* (2013.01)

(58) Field of Classification Search
CPC ...... A63F 13/213; A63F 13/215; A63F 13/86; A63F 13/87; H04L 65/61; G06F 3/1454; G06F 3/165
See application file for complete search history.

(56) References Cited

U.S. PATENT DOCUMENTS

| 9,986,001 B2 | 5/2018 | Takaichi |
| 10,987,595 B1 * | 4/2021 | Simon ................... A63F 13/792 |

(Continued)

FOREIGN PATENT DOCUMENTS

WO 2014068806 A1 5/2014

OTHER PUBLICATIONS

Sloppy Games, First OBS Studios, URL:http://sloppy-games.com/初めてのobs-studio・各種ボタンと使い方解説/, 10 pages, May 23, 2018 (See Non-Pat. Lit. #1 filed Sep. 6, 2022).

(Continued)

*Primary Examiner* — Lawrence S Galka

(57) ABSTRACT

A game image generation unit generates a game image, and a game audio generation unit generates a game audio. An audio acquiring unit acquires a microphone audio input to a microphone. A distribution processing unit distributes the microphone audio, the game audio, and the game image. An accepting unit accepts an operation made by a user. During distribution of the microphone audio, the game audio, and the game image, after the accepting unit accepts a predetermined operation, the distribution processing unit operates in either a first mode in which a first standby image is distributed and the microphone audio is distributed as well or a second mode in which a second standby image is distributed but the microphone audio is not distributed.

6 Claims, 12 Drawing Sheets

PLEASE WAIT ANOTHER MOMENT UNTIL STREAMING IS RESUMED.
(MICROPHONE AUDIO IS ALSO CURRENTLY MUTED.)

14a,14b,14c

(51) Int. Cl.
  *A63F 13/53* (2014.01)
  *A63F 13/86* (2014.01)
  *A63F 13/812* (2014.01)

(56) References Cited

U.S. PATENT DOCUMENTS

2015/0281296 A1* 10/2015 Takaichi ............ H04N 21/4788
  709/231
2015/0290540 A1* 10/2015 Trombetta .............. A63F 13/79
  463/31
2017/0109122 A1   4/2017 Schmidt

OTHER PUBLICATIONS

Basic OBS studio setup, open broadcaster software streaming knowledge base, URL:https://www.obs.live/ articles/2018/7/23/basic-obs-studio-setup>, 10 pages, Aug. 2, 2018 (See non-pat Lit. #1 filed Sep. 6, 2022).
Extended European Search Report for corresponding EP Application No. 21776334.1, 11 pages, dated Mar. 5, 2024.
International Search Report for corresponding PCT Application No. PCT/JP2021/011301, 6 pages, dated Jun. 1, 2021.
Sloppy Games, First OBS Studios, URL:http://sloppy-games.com/%E5%88%9D%E3%82%81%E3%81%A6%E3%81%AEobs-studio%E3%83%BB%E5%90%84%E7%A8%AE%E3%83%9C%E3%82%BF%E3%83%B3%E3%81%A8%E4%BD%BF%E3%81%84%E6%96%B9%E8%A7%A3%E8%AA%AC/>, 11 pages, May 23, 2018 (See Non-Pat. Lit. #1).
Basic OBS studio setup, open broadcaster software streaming knowledge base, URL:https://www.obs.live/articles/2018/7/23/basic-obs-studio-setup>, Aug. 2, 2018 (See non-pat Lit. #1).

* cited by examiner

F I G. 2
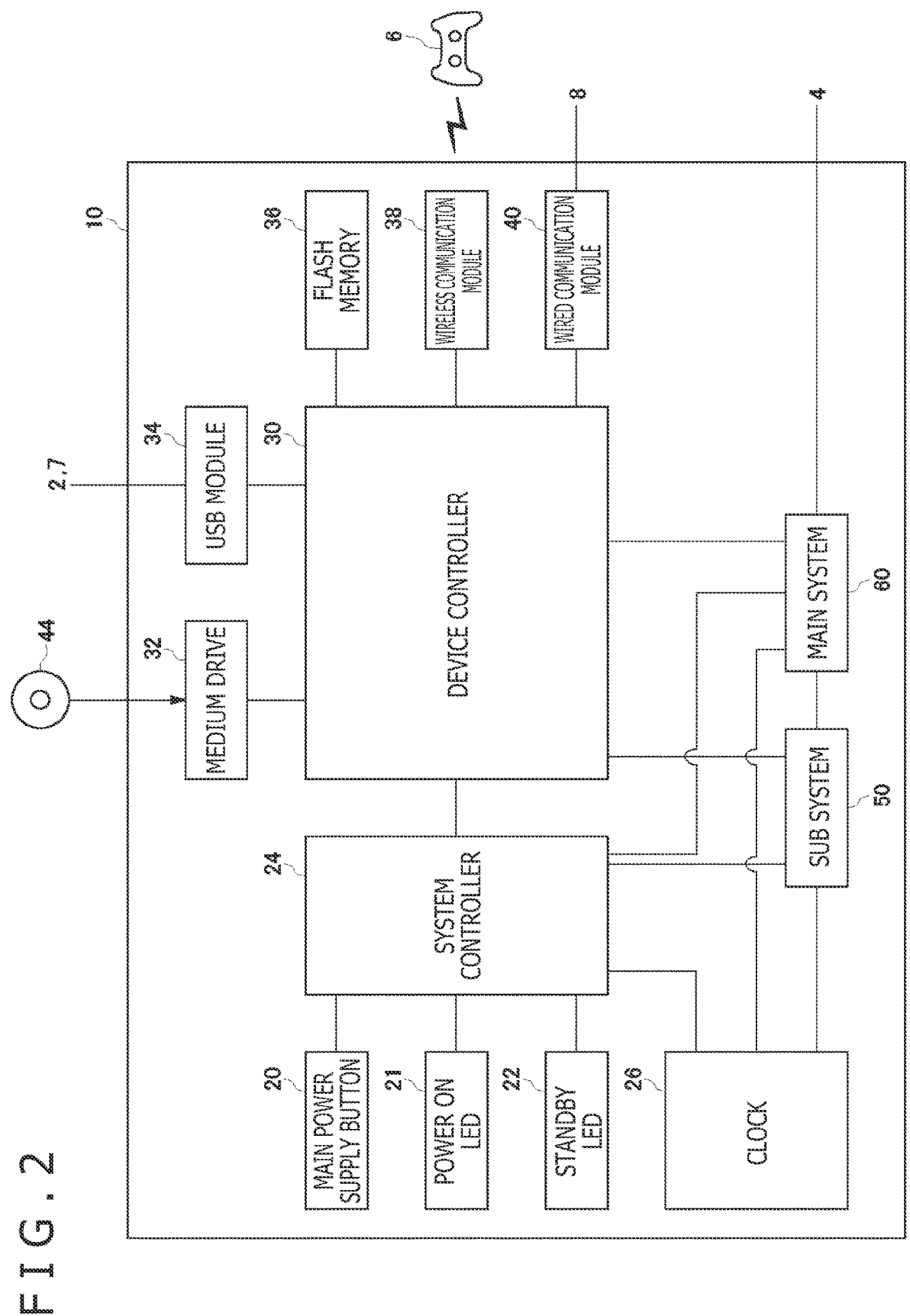

FIG. 11

PLEASE WAIT ANOTHER MOMENT UNTIL STREAMING IS RESUMED.
(MICROPHONE AUDIO IS ALSO CURRENTLY MUTED.)

14a,14b,14c

INFORMATION PROCESSING DEVICE AND IMAGE DISTRIBUTION METHOD

TECHNICAL FIELD

The present invention relates to a technique of distributing an image.

BACKGROUND ART

PTL 1 discloses a system in which a display image including a game image of a game being played by a distribution user is distributed to viewing users through a shared server. During distribution of the display image, when the distribution user operates a predetermined button of a game controller, a menu image is displayed in place of the game image on an output device of the distribution user. At this time, a distribution processing unit does not distribute the display image including the menu image but distributes a standby image that is different from the display image. In the system disclosed in PTL 1, a standby image including a message "PLEASE WAIT A LITTLE" is displayed on a display device of each viewing user until distribution of the game image is resumed.

CITATION LIST

Patent Literature

[PTL 1] WO 2014/068806A

SUMMARY

Technical Problem

Distribution of a game image is temporarily stopped for various reasons. Providing a plurality of types of modes of temporarily stopping distribution of the game image makes it possible for the distribution user to temporarily stop distribution of the game image in a distribution stop mode suitable for a situation of the distribution user.

In view of this, the present invention has an object to provide a technique for enhancing usability of an image sharing system of distributing a game image to a viewing user.

Solution to Problem

To solve the above-mentioned problem, an information processing device according a mode of the present invention includes a game image generation unit configured to generate a game image, a game audio generation unit configured to generate a game audio, an audio acquiring unit configured to acquire a microphone audio input to a microphone, a distribution processing unit configured to distribute the microphone audio, the game audio, and the game image, and an accepting unit configured to accept an operation made by a user. During distribution of the microphone audio, the game audio, and the game image, after the accepting unit accepts a predetermined operation, the distribution processing unit operates in either a first mode in which a first standby image is distributed and the microphone audio is distributed as well or a second mode in which a second standby image is distributed but the microphone audio is not distributed.

An image distribution method according another mode of the present invention includes a step of generating a game image, a step of generating a game audio, a step of acquiring a microphone audio input to a microphone, a step of distributing the microphone audio, the game audio, and the game image, a step of accepting a predetermined operation during the distribution of the microphone audio, the game audio, and the game image, and a step of executing, after the predetermined operation is accepted, either a first mode in which a first standby image is distributed and the microphone audio is distributed as well or a second mode in which a second standby image is distributed but the microphone audio is not distributed.

Note that any combinations of the above components and conversions of the expressions of the present invention between a method, a device, a system, a recording medium, a computer program, and the like are also effective as modes of the present invention.

BRIEF DESCRIPTION OF DRAWINGS

FIG. 2 is a diagram depicting a hardware configuration of an information processing device.

FIG. 11 is a diagram depicting another example of a screen to be displayed on an output device of each viewing user.

DESCRIPTION OF EMBODIMENT

Figure 1:
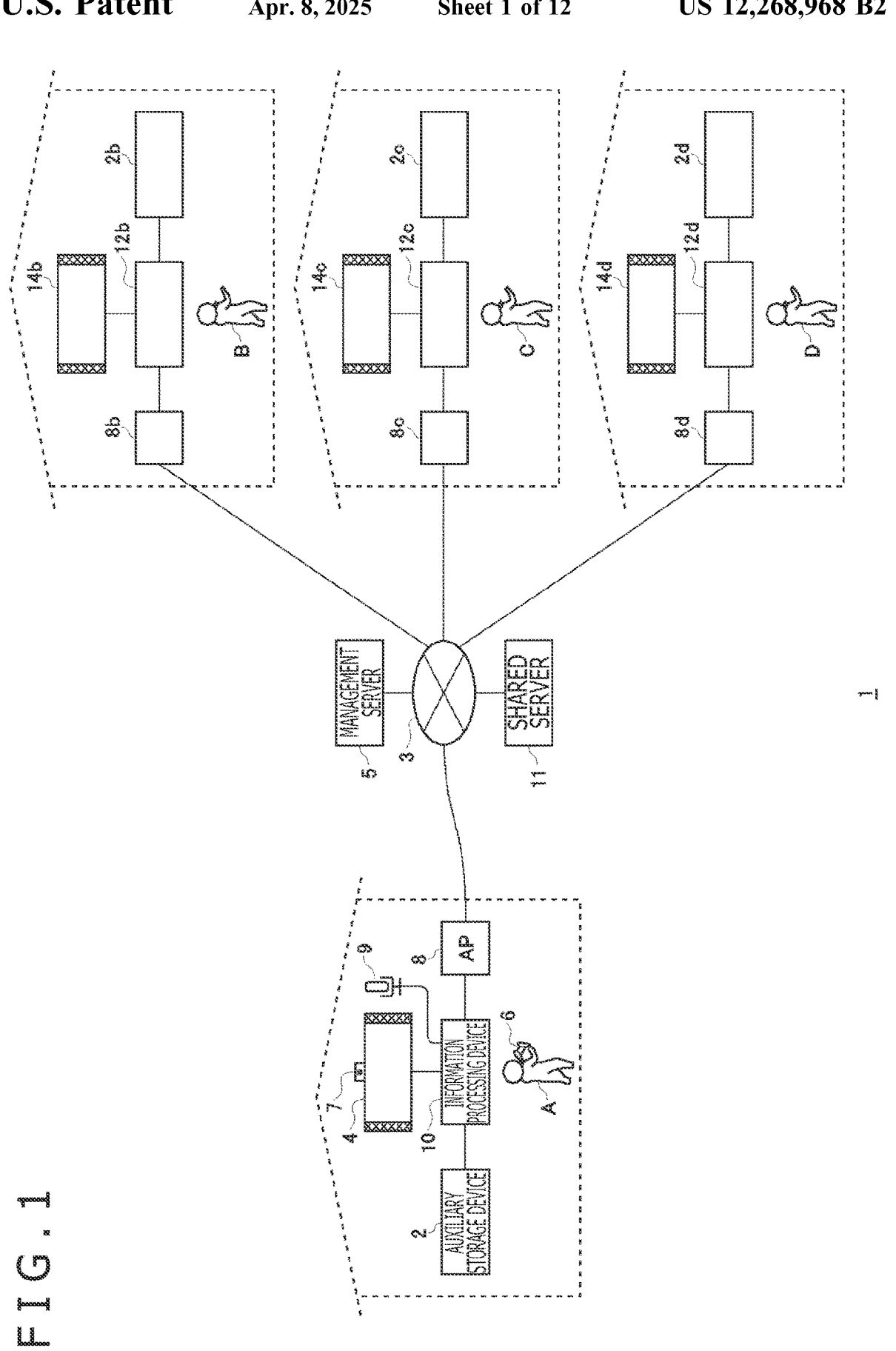
FIG. 1 is a diagram depicting an image sharing system according to an embodiment of the present invention.

FIG. 1 is a diagram depicting an image sharing system 1 according to an embodiment of the present invention. The image sharing system 1 realizes an environment in which a user A as a distributor performs live distribution of a game image and audio (a game image and game audio) during a play and other viewing users B, C, and D view the game image and audio. The image sharing system 1 includes an information processing device 10 operated by the distribution user A, information processing terminals 12b, 12c, and 12d operated by the respective viewing users B, C, and D (hereinafter referred to as an "information processing terminal 12" when not particularly distinguished from each other), a management server 5, and a shared server 11, and they are connected to one another through a network 3 such as the Internet. Here, the viewing users B, C, and D are merely examples and not limited to three. Also, the viewing users are not limited to users who have registered as a friend of the distribution user A and may be an unspecified user who can access the shared server 11.

A configuration of the information processing terminal 12 of each of the viewing users may be the same as a configuration of the information processing device 10 of the distribution user A in the embodiment. The configuration of the periphery of the information processing device 10 of the distribution user A will be described below as a representative example.

An access point (hereinafter referred to as an "AP") 8 has functions of a wireless access point and a router, and the information processing device 10 connects to the AP 8 in a wireless or a wired manner to communicatably connect to the management server 5, the shared server 11, and the information processing terminal 12 on the network 3.

An input device 6 which is operated by a user establishes connection to the information processing device 10 in a wireless or a wired manner and outputs operation information regarding an operation made by the user to the information processing device 10. When receiving the operation information from the input device 6, the information processing device 10 reflects the operation information on processing of system software or application software, and causes an output device 4 to output a result of the processing. In the embodiment, the information processing device 10 may be a game device which executes a game program, and the input device 6 may be a game controller. The input device 6 includes a plurality of input sections such as a plurality of push-type operation buttons, an analog stick capable of inputting an analog quantity, and a rotary button.

An auxiliary storage device 2 is a storage such as a hard disk drive (HDD) or a solid state drive (SSD) and may be a built-in type storage device, or may be an external storage device connected to the information processing device 10 by a universal serial bus (USB) or the like. The output device 4 may be a television set having a display which outputs an image and a loudspeaker which outputs audio. The output device 4 may alternatively be a head-mounted display. A camera 7 captures a space in which the user is present. An ambient sound is input to a microphone 9, and the microphone 9 generates an audio signal. In the embodiment, a voice of the user is input to the microphone 9, and the microphone 9 supplies a microphone audio signal (hereinafter, simply referred to as a "microphone audio" as well) to the information processing device 10.

The information processing device 10 performs streaming distribution of a game image of a game being played by the user A to the shared server 11 to broadcast the game image to the information processing terminal 12 which accesses the shared server 11. Thus, the image sharing system 1 in the embodiment works as a game image distribution system. Note that the information processing terminal 12 may be a stationary game console which is the same as the information processing device 10, or may be a portable terminal device such as a smartphone or a tablet.

The management server 5 provides a network service to the user of the information processing device 10 and to the user of the information processing terminal 12. The management server 5 manages network accounts for identifying the users, and each user uses own network account to sign in to the network service. By signing in to the network service, the user can register save data of a game or a virtual award article (trophy) acquired during a gameplay into the management server 5.

The management server 5 manages an activity of the user who signs in to the network service. The activity of the user includes an action of the user in the game, a result obtained by the action of the user, and a state of the user in the game or a session. In response to a request from the user, the management server 5 provides information regarding the activity of the user to the information processing device 10 of the user or the information processing terminal 12.

In the embodiment, the user A plays a game by operating the input device 6, and a game image during the play (hereinafter also referred to as a "play image") is displayed on the output device 4. At this time, the play image is also distributed to the information processing terminals 12b, 12c, and 12d of the respective viewing users through the shared server 11 from the information processing device 10, so that the play image is displayed on each of output devices 14b, 14c, and 14d (hereinafter referred to as an "output device 14" when not particularly distinguished from each other). Note that a resolution of the play image to be distributed may be set lower than a resolution of the play image to be displayed on the output device 4.

FIG. 2 depicts a hardware configuration of the information processing device 10. The information processing device 10 includes a main power supply button 20, a power ON light emitting diode (LED) 21, a standby LED 22, a system controller 24, a clock 26, a device controller 30, a medium drive 32, a USB module 34, a flash memory 36, a wireless communication module 38, a wired communication module 40, a sub system 50, and a main system 60.

The main system 60 includes a main central processing unit (CPU), a memory as a main storage device, a memory controller, a graphics processing unit (GPU), and the like. The GPU is mainly used in arithmetic processing for a game program. These functions may be configured as a system-on-chip and formed on one chip. The main CPU has a function of executing a game program recorded in the auxiliary storage device 2 or a read-only memory (ROM) medium 44.

The sub system 50 includes a sub CPU, a memory as a main storage device, a memory controller, and the like. The sub system 50 does not include a GPU. Further, the sub system 50 does not have a function of executing a game program. The number of circuit gates of the sub CPU is smaller than the number of circuit gates of the main CPU, and the operation power consumption of the sub CPU is lower than that of the main CPU. The sub CPU operates while the main CPU is in a standby state, and the processing functions of the sub CPU are limited in order to suppress the power consumption of the sub CPU low.

The main power supply button 20 is an input unit on which operation input is made by the user, and is provided on a front face of a housing of the information processing device 10. The main power supply button 20 is operated to turn on or off the power supply to the main system 60 of the information processing device 10. The power ON LED 21 is lit when the main power supply button 20 is turned on, and the standby LED 22 is lit when the main power supply button 20 is turned off.

The system controller 24 detects pressing of the main power supply button 20 by the user. When the main power supply button 20 is pressed while the main power supply is in an off-state, then the system controller 24 acquires the pressing operation as an "on-instruction." Conversely, when the main power supply button 20 is pressed while the main power supply is in an on-state, the system controller 24 then acquires the pressing operation as an "off-instruction."

The clock 26 is a real time clock, and generates date and time information at present and supplies the generated information to the system controller 24, the sub system 50, and the main system 60. The device controller 30 is configured as a large-scale integrated (LSI) circuit which executes delivery of information between devices like a south bridge. As depicted in FIG. 2, such devices as the system controller 24, the medium drive 32, the USB module 34, the flash memory 36, the wireless communication module 38, the wired communication module 40, the sub system 50, and the main system 60 are connected to the device controller 30. The device controller 30 absorbs a difference in electric characteristic and a difference in data transfer rate between the devices and controls a timing of data transfer.

The medium drive 32 is a drive device which loads the ROM medium 44 on which application software of a game or the like and license information are recorded, and which drives the ROM medium 44 to read out a program, data, and the like from the ROM medium 44. The ROM medium 44 may be a read-only recording medium such as an optical disc, a magneto-optical disc, or a Blu-ray disc.

The USB module 34 is a module to be connected to an external device by a USB cable. The USB module 34 may be connected to the auxiliary storage device 2 and the camera 7 by a USB cable. The flash memory 36 is an auxiliary storage device which configures an internal storage. The wireless communication module 38 wirelessly communicates, for example, with the input device 6 by use of a communication protocol such as a Bluetooth (registered trademark) protocol or Institute of Electrical and Electronics Engineers (IEEE) 802.11 protocol. The wired communication module 40 communicates with an external device in a wired manner and is connected to the outside network through the AP 8.

Figure 3:
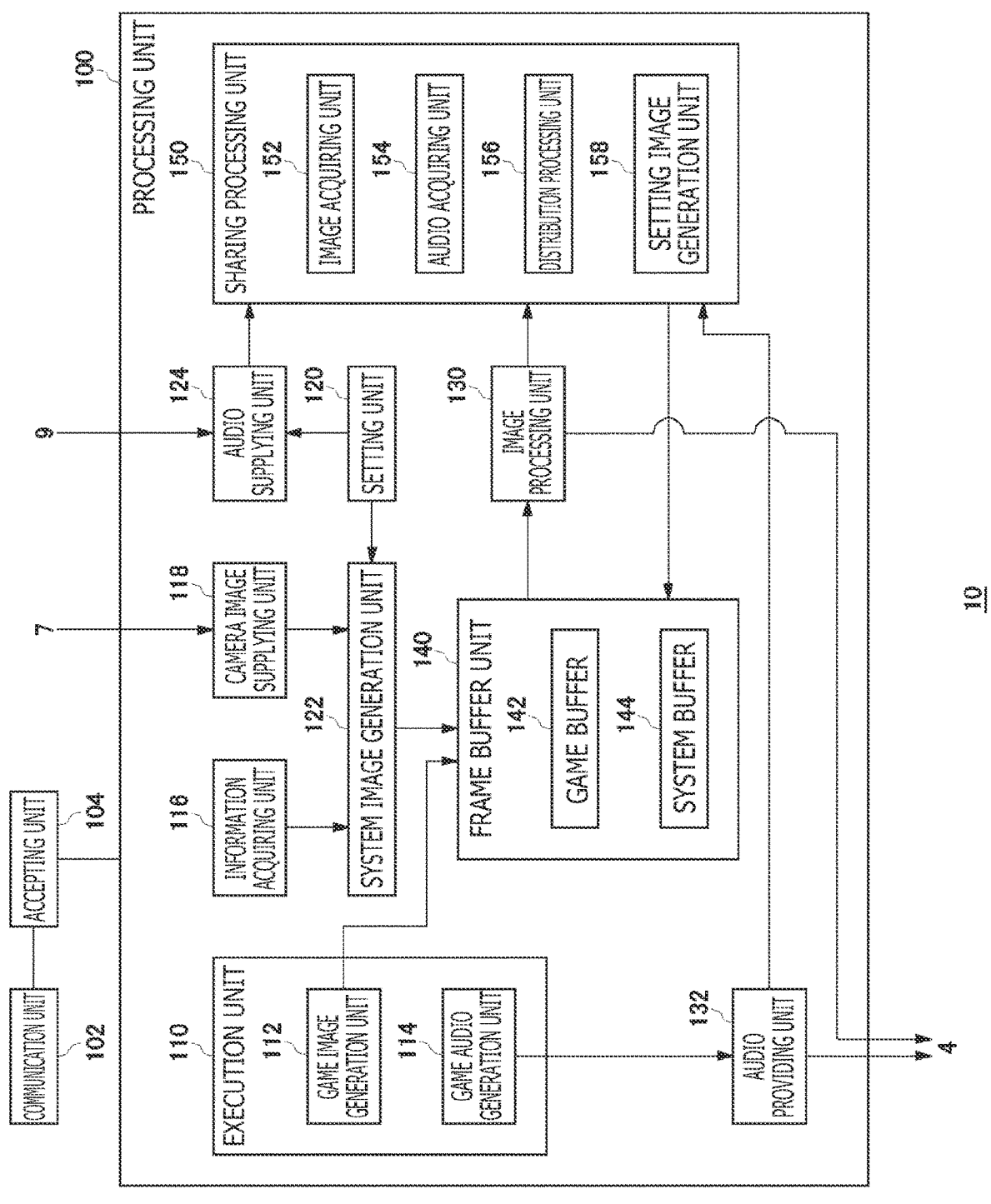
FIG. 3 is a diagram depicting functional blocks of the information processing device.

FIG. 3 depicts functional blocks of the information processing device 10 which works as a distribution device for streaming data. The information processing device 10 includes a processing unit 100, a communication unit 102, and an accepting unit 104. The processing unit 100 includes an execution unit 110, an information acquiring unit 116, a camera image supplying unit 118, a setting unit 120, a system image generation unit 122, an audio supplying unit 124, an image processing unit 130, an audio providing unit 132, a frame buffer unit 140, and a sharing processing unit 150.

The execution unit 110 includes a game image generation unit 112 and a game audio generation unit 114. The frame buffer unit 140 includes a plurality of frame buffers, such as a game buffer 142 and a system buffer 144. In the embodiment, the game buffer 142 includes a plurality of frame buffers, and the system buffer 144 includes one frame buffer. The sharing processing unit 150 includes an image acquiring unit 152, an audio acquiring unit 154, a distribution processing unit 156, and a setting image generation unit 158.

In FIG. 3, elements indicated as functional blocks for performing various processing operations can be configured by hardware such as a circuit block, a memory, or other LSI or implemented by software such as system software or a game program loaded into the memory. Thus, it will be understood by those skilled in the art that these functional blocks may variously be implemented by hardware only, by software only, or by a combination of hardware and software. The functional blocks are not limited to any of these.

The communication unit 102 receives operation information obtained as a result of operation made by the user on the input unit of the input device 6 and receives information regarding activities of the user from the management server 5. The communication unit 102 also transmits the image and audio data generated in the processing unit 100 to the shared server 11. It is assumed that the communication unit 102 has the functional blocks of the wireless communication module 38 and wired communication module 40 depicted in FIG. 2.

The accepting unit 104 is disposed between the communication unit 102 and the processing unit 100 and transmits data or information to and from the communication unit 102 and the processing unit 100. When accepting operation information of the input device 6 through the communication unit 102, the accepting unit 104 supplies the accepted operation information to predetermined functional blocks of the processing unit 100.

The execution unit 110 executes a game program (hereinafter referred to simply as a "game" in some cases). The functional block provided as the execution unit 110 is realized by software such as the system software or the game software, the hardware such as the GPU, or the like. When receiving a result of the execution of the game program, the game image generation unit 112 generates image data of the game, and the game audio generation unit 114 generates audio data of the game. Note that the game is merely an example of an application, and the execution unit 110 may execute an application other than a game.

During a gameplay by the user A, the execution unit 110 executes a game program and executes arithmetic processing to move a game character in a virtual space on the basis of the operation information that the user A inputs to the input device 6. The game image generation unit 112 includes a GPU which executes rendering processing or the like, and receives a result of the arithmetic processing in the virtual space to generate game image data from a viewpoint position (virtual camera) in the virtual space. Moreover, the game audio generation unit 114 generates game audio data in the virtual space.

Figure 4:
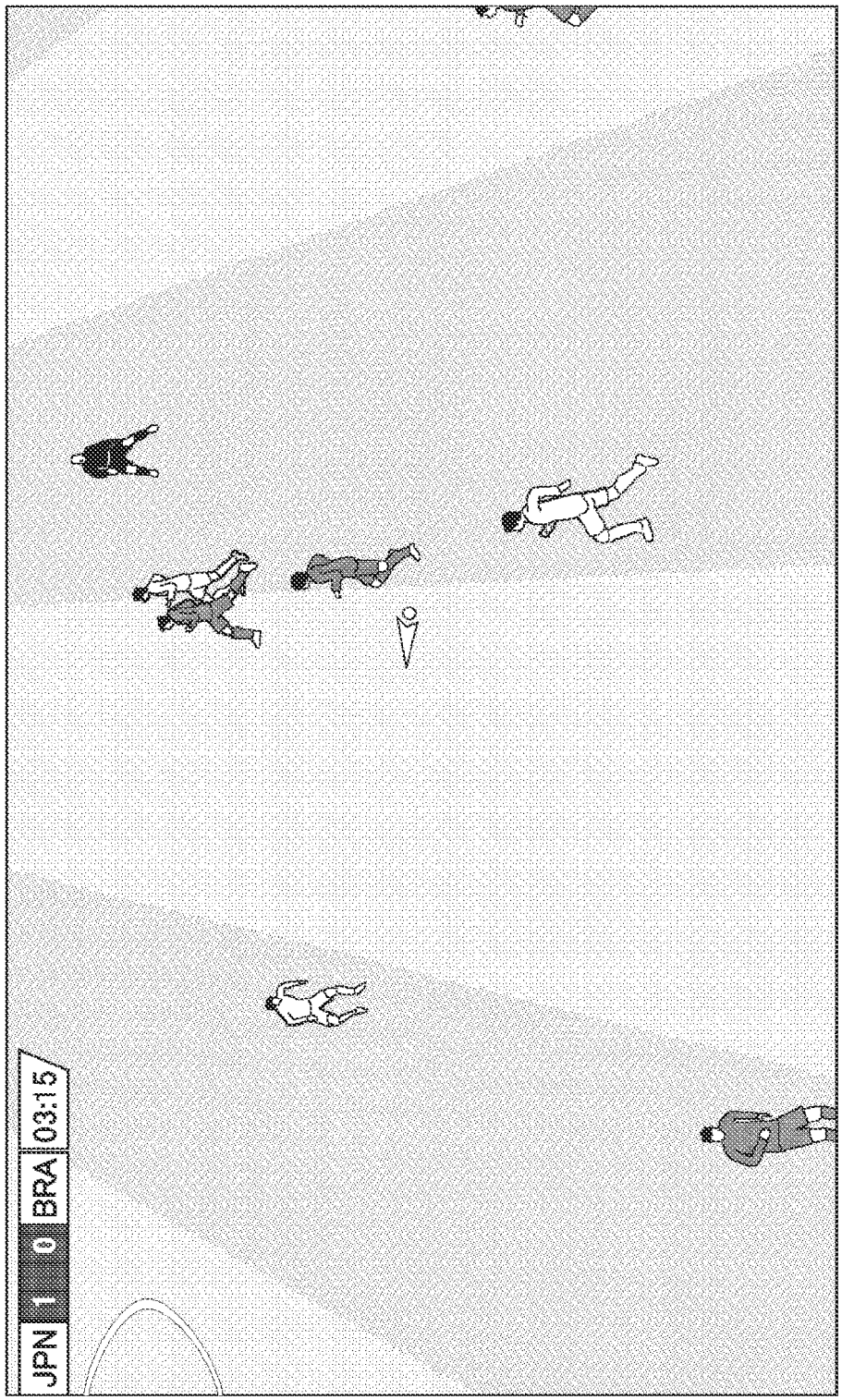
FIG. 4 is a diagram depicting an example of a game screen.

FIG. 4 is a diagram depicting an example of a game screen displayed on the output device 4 of the user A. This game screen is the game screen prior to streaming distribution. During a gameplay of the user A, the game image generation unit 112 generates a game image and stores the generated game image in the game buffer 142. In addition, the game audio generation unit 114 generates game audio and supplies the generated game audio to the audio providing unit 132.

The game buffer 142 in the embodiment includes a plurality of frame buffers, and the game image generation unit 112 can generate a plurality of game images as many as the frame buffers as the upper limit. For example, in a case in which the game buffer 142 has three frame buffers, the game image generation unit 112 generates one main image including a background image and a character image, and two sub images including supplemental information for game progress, and stores each image in corresponding one of the frame buffers. For example, the sub image may be a map image indicating a position of an opponent team in a competitive game or may be a list image of information regarding weapons that the player can use. The image processing unit 130 merges three game images which are stored in the three frame buffers, to generate a display image. Note that the game image generation unit 112 does not need to generate three game images. For example, the game image generation unit 112 is only required to generate one main image and use one frame buffer and may not use the two other frame buffers.

The image processing unit 130 provides the display image to the output device 4, and the audio providing unit 132 provides the game audio to the output device 4. The output device 4 outputs the game image and the game audio, and the user A plays the game while viewing the game image and audio output from the output device 4.

Hereinafter, the sharing process in the embodiment will be described.

The sharing processing unit 150 performs a process for sharing image and audio data of the game being played by the user A with another user through the shared server 11. Users who access the shared server 11 are not limited to the friends of the user A, and may include unspecified users who use the service of the shared server 11. The sharing process of the game image and audio data is started at a time when the user A has operated a specified input button (SHARE button) provided in the input device 6, as a trigger, and the setting image generation unit 158 generates an input image indicating options regarding sharing of the image and audio data.

Figure 5:
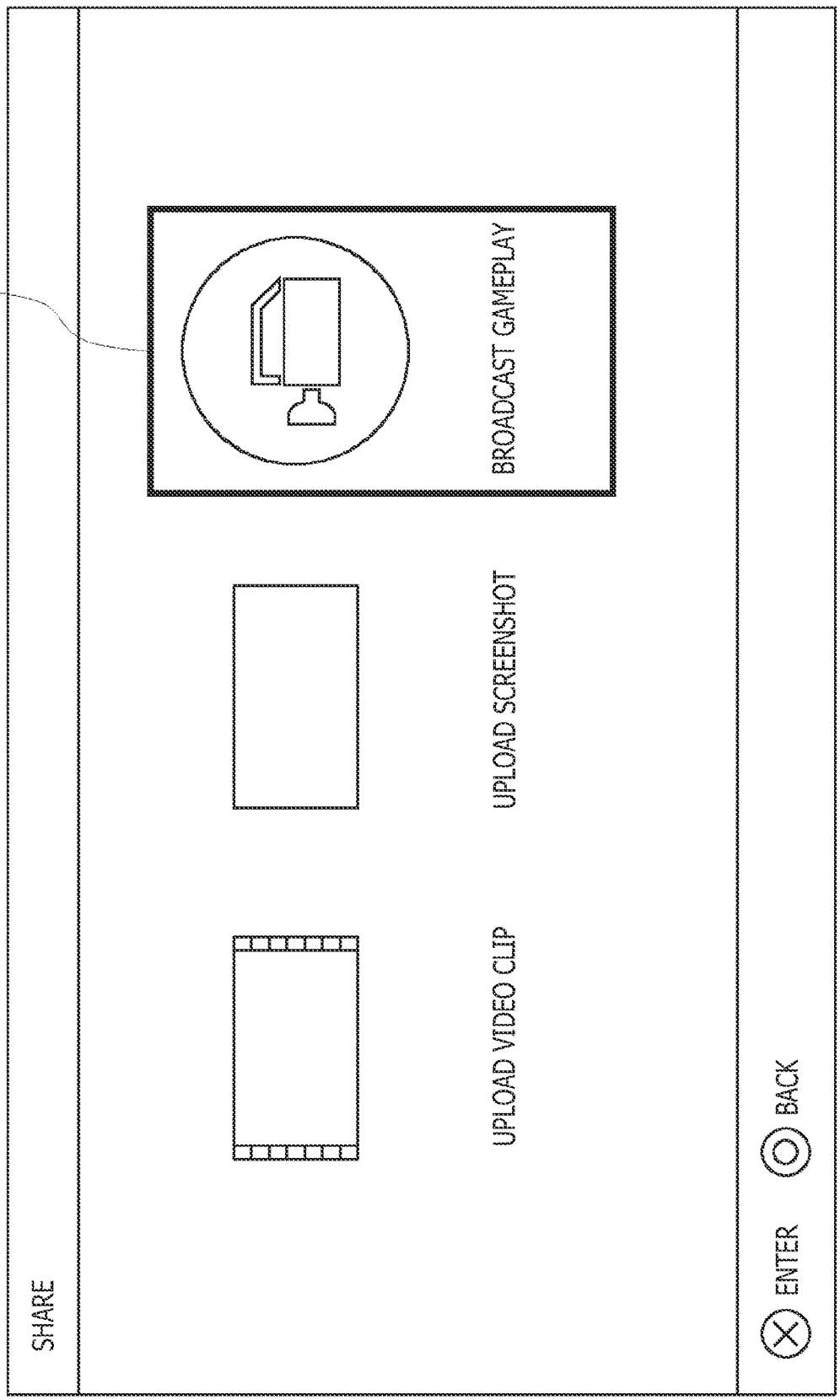
FIG. 5 is a diagram depicting an example of an input screen indicating options of a sharing process.

FIG. 5 depicts an example of an input screen indicating the options in the sharing process. The setting image generation unit 158 generates an input image indicating the options in the sharing process and stores the generated input image in the system buffer 144. The image processing unit 130 reads out the input image from the system buffer 144 to display the read input image on the output device 4.

On this input screen, three options regarding the sharing of the image and audio data are indicated. The option "UPLOAD VIDEO CLIP" is a graphical user interface (GUI) element for designating that an image recorded in the auxiliary storage device 2 is to be uploaded to the shared server 11. The option "UPLOAD SCREENSHOT" is a GUI element for designating that an image of a screenshot is to be uploaded to the shared server 11. The option "BROADCAST GAMEPLAY" is a GUI element for designating that the image and audio data of the game is to be relayed on a real time basis through the shared server 11. The user A operates the input device 6 to move a selection frame 200, and then selects any one of the GUI elements and presses an ENTER button, thereby executing the sharing process selected.

In this embodiment, the GUI element "BROADCASTS GAMEPLAY" is assumed to be selected. Note that, after this GUI element is selected, the setting image generation unit 158 displays a setting screen for selecting setting information in broadcast distribution on the output device 4.

Figure 6:
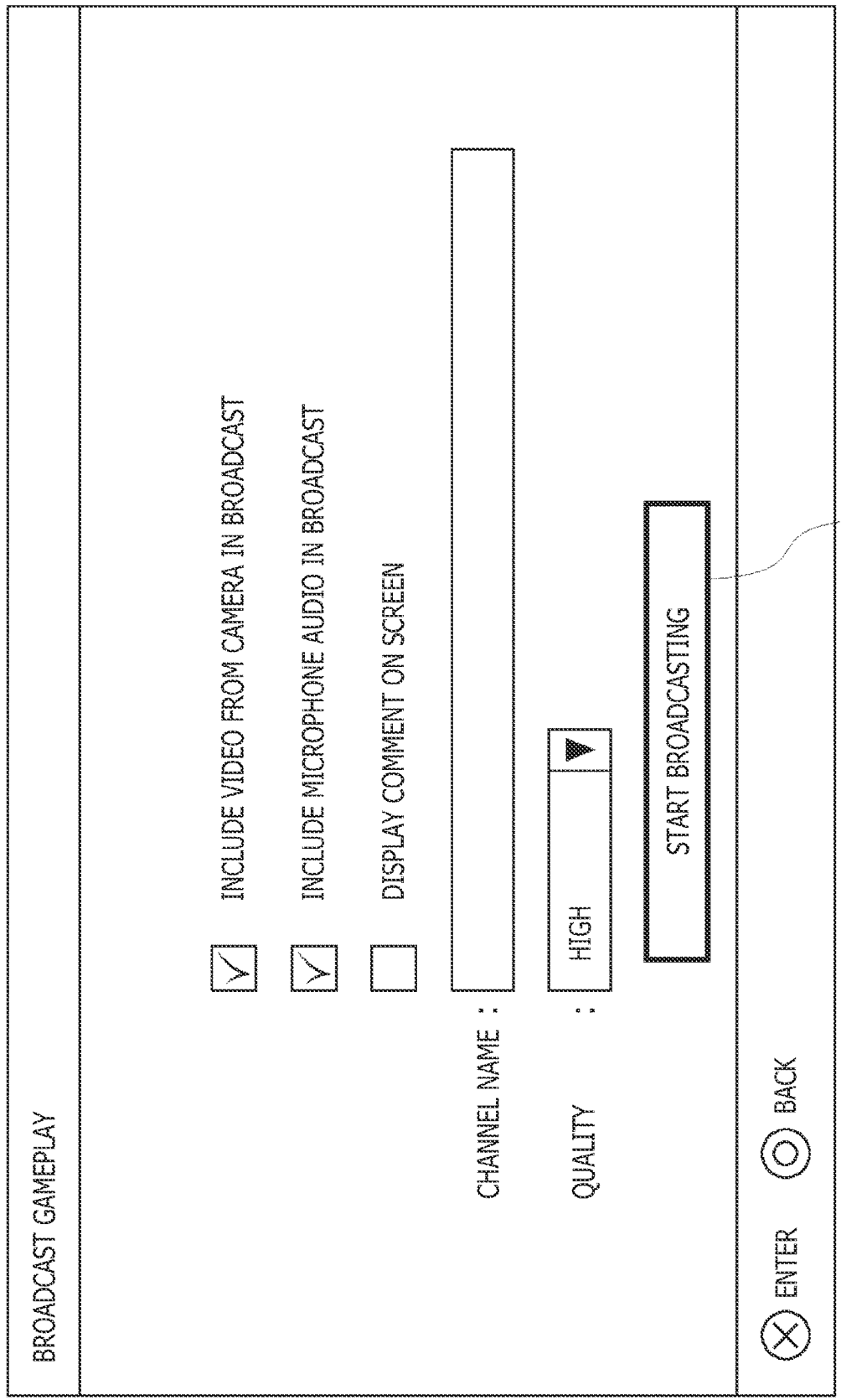
FIG. 6 is a diagram depicting an example of a setting screen.

FIG. 6 depicts an example of the setting screen to be displayed in a case in which "BROADCASTS GAMEPLAY" is selected. This setting screen includes the following items for setting a distribution mode of the broadcast.

(a) Item for Selecting Whether or not Camera Image is Included in Distribution Image With respect to the item (a), a check box "INCLUDE VIDEO FROM CAMERA IN BROADCAST" may be in a selected state by default. When the user A does not want to distribute a camera image (an image captured by the camera), the user A cancels the selection of the check box. Note that, in a case in which the option "INCLUDE VIDEO FROM CAMERA IN BROADCAST" is selected, another option for setting a display position of the camera image may be provided, and the user A may be allowed to designate the display position of the camera image.

(b) Item for Selecting Whether or Not Microphone Audio is Distributed

With respect to the item (b), a check box "INCLUDE MICROPHONE AUDIO IN BROADCAST" may be in a selected state by default. When the user A does not want to distribute a microphone audio, the user A cancels the selection of the check box.

(c) Item for Selecting Whether or Not Comment from Viewing User is Displayed on Display Screen With respect to the item (c), a check box "DISPLAY COMMENT ON SCREEN" may be in a selected state by default. When the user A does not want display of any comment, the user A cancels the selection of the check box.

(d) Item for Selecting Image Quality of Distribution Image

With respect to the item (d), the user A can select a resolution equal to or lower than a resolution of the game image to be displayed on the output device 4. As a resolution of the distribution image, the resolution lower than the resolution of the game image displayed on the output device 4 may be set by default.

As described above, the setting unit 120 sets contents selected by the user A in the items (a), (b), (c), and (d), regarding streaming distribution. Specifically, when the user A arranges a frame 202 on "START BROADCASTING" and presses the ENTER button of the input device 6, the setting unit 120 registers the contents selected by the user A in the items (a), (b), (c), and (d) in the auxiliary storage device 2, as the setting information of the streaming distribution, supplying the setting information to the system image generation unit 122 and the audio supplying unit 124.

In the following, a distribution process in a case in which "INCLUDE VIDEO FROM CAMERA IN BROADCAST" is set in the item (a) and "INCLUDE MICROPHONE AUDIO IN BROADCAST" is set in the item (b) will be described.

Figure 7:
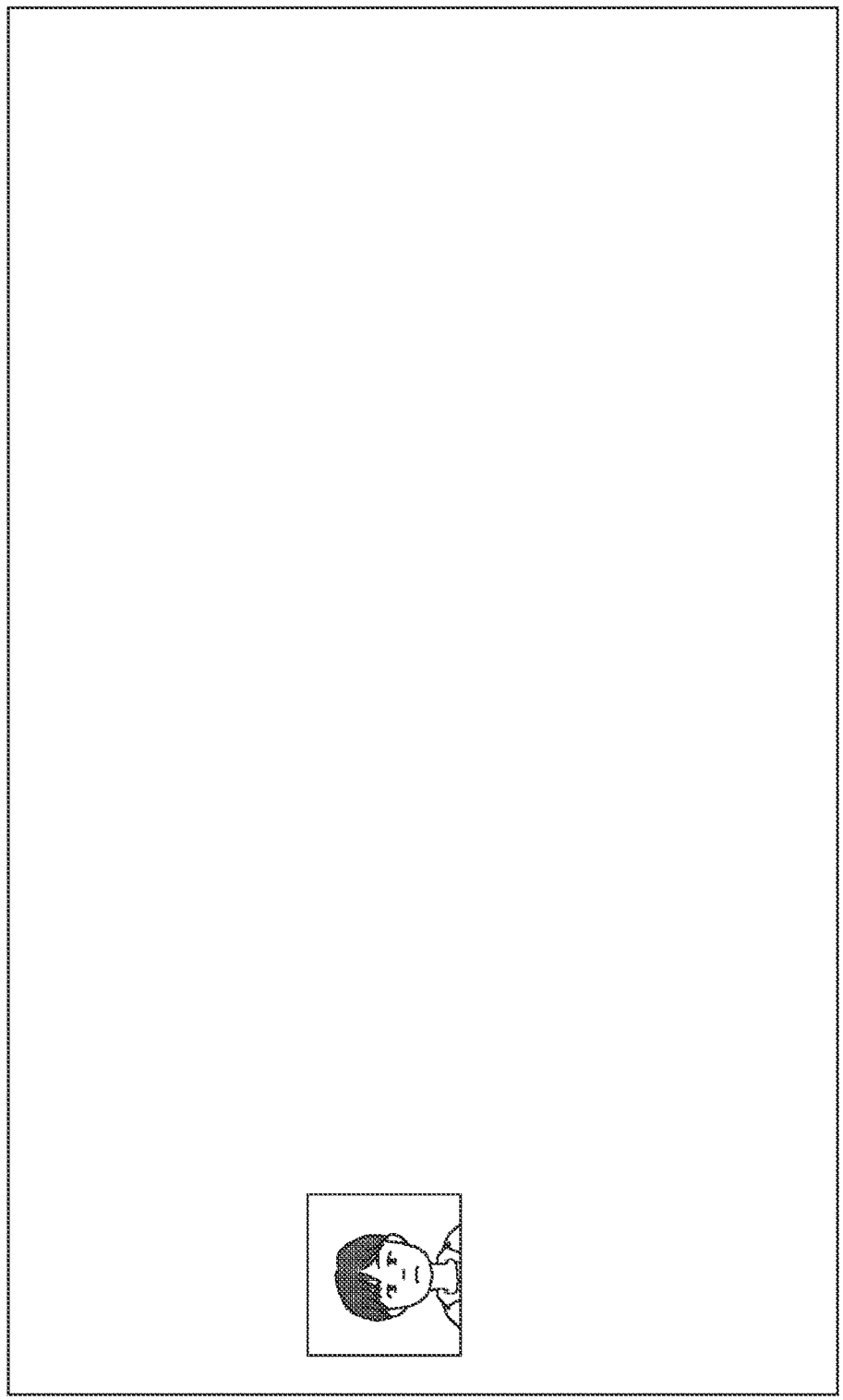
FIG. 7 is a diagram depicting an example of a system image.

FIG. 7 depicts an example of a system image generated by the system image generation unit 122. During streaming distribution, the camera image supplying unit 118 supplies the camera image captured by the camera 7 to the system image generation unit 122, and the system image generation unit 122 generates a system image including the camera image, and then, the generated system image is stored in the system buffer 144. The system image generation unit 122 includes system software, and in the embodiment, a system image means an image generated by the system software.

Figure 8:
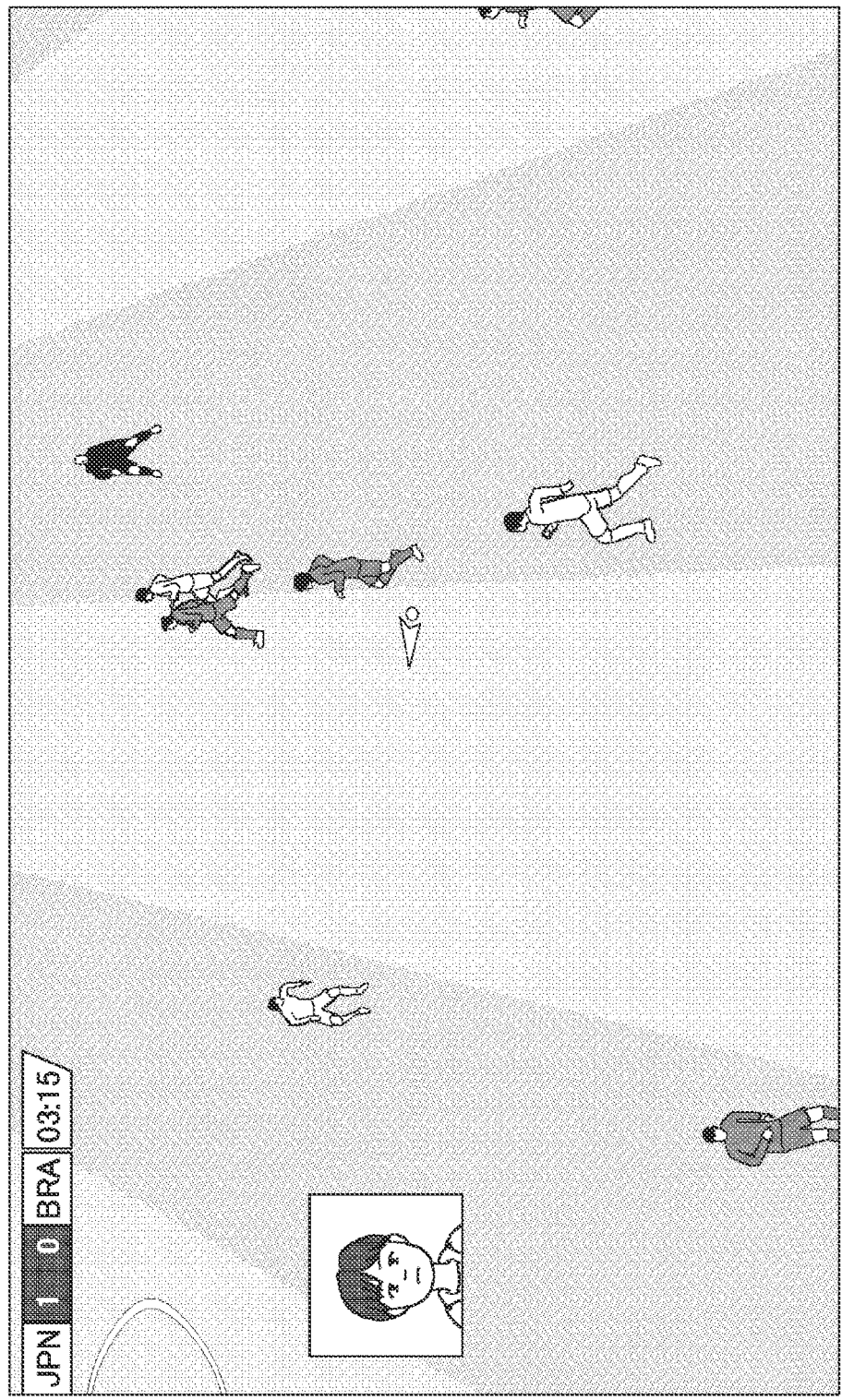
FIG. 8 is a diagram depicting an example of a screen to be displayed on an output device.

FIG. 8 depicts an example of a screen displayed on the output devices of the user A and the viewing users during streaming distribution. The image processing unit 130 merges the game image read out from the game buffer 142 and the system image read out from the system buffer 144, to generate a display image. The image processing unit 130 outputs the generated display image to the output device 4 and the sharing processing unit 150. The audio providing unit 132 outputs the game audio generated by the game audio generation unit 114 to the output device 4 and the sharing processing unit 150. The audio supplying unit 124 acquires the microphone audio input to the microphone 9 and supplies the acquired microphone audio to the sharing processing unit 150.

In the sharing processing unit 150, the image acquiring unit 152 acquires the game image provided by the image processing unit 130. The audio acquiring unit 154 acquires the game audio provided by the audio providing unit 132 and the microphone audio supplied by the audio supplying unit 124. The game image acquired by the image acquiring unit 152 and the game audio and the microphone audio which are acquired by the audio acquiring unit 154 are a distribution image and a distribution audio that are to be distributed to the shared server 11, respectively. The distribution processing unit 156 adjusts the quality of each of the distribution image and the distribution audio thus acquired as needed, encodes them, and distributes the encoded microphone audio data, game audio data, and game image data to the shared server 11 by streaming. Thus, in the image sharing system 1, the game image and the game audio viewed by the user A who plays the game are distributed by streaming as they are, while the quality of each of the game image and the game audio has some change. Accordingly, the viewing users can access the shared server 11 from the information processing terminals 12 to view the same game image and the same game audio as the user A.

Hereinafter, a case in which the information processing device 10 automatically stops streaming distribution of the game image and audio will be described. As an example, it is assumed that, while the game image and audio are distributed by streaming, the user A causes the output device 4 to display the menu screen.

Various types of personal information are included on the menu screen, in some cases, and accordingly, distributing the menu screen including the personal information to unspecified viewing users is not preferable. In view of this, when displaying the menu screen, the information processing device 10 has a function of automatically stopping the streaming distribution of the game image and audio to prevent leakage of the personal information.

In the information processing device 10, when a predetermined button (for example, a HOME button) of the input device 6 is operated, the accepting unit 104 accepts the operation as an operation for displaying a system image, and the system image generation unit 122 generates the system image which is a menu image. The generated system image is stored in the system buffer 144, merged into the display image by the image processing unit 130, and displayed on the output device 4.

Figure 9:
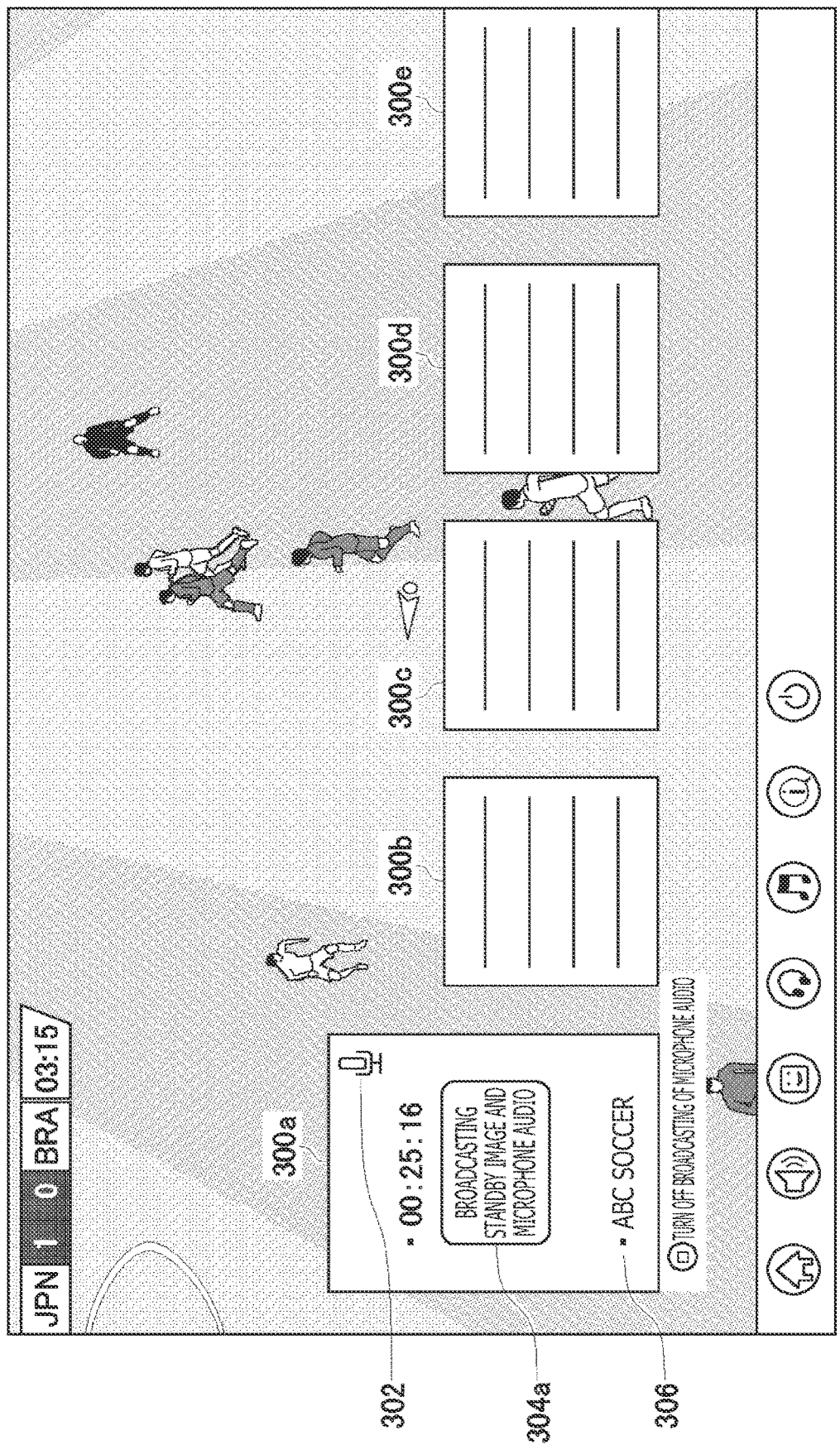
FIG. 9 is a diagram depicting an example of a menu screen.

FIG. 9 illustrates an example of the menu screen. The system image generation unit 122 generates a menu image (system image) in which a plurality of menu icons is arranged on a lower part of the screen and GUI elements 300a to 300e in a card-like shape are arranged on a middle part of the screen. Each of the GUI elements has information regarding an activity of the user A displayed therein.

When the accepting unit 104 accepts an operation of the predetermined button (HOME button) while the game image and audio are distributed by streaming, the information acquiring unit 116 requests provision of the information regarding the activity of the user A to the management server 5. At this time, the information acquiring unit 116 includes status information of the user A in the request of the provision of the information. The status information is information indicating a current situation of the user A, and is information indicating that the user A is distributing the game image and audio by streaming.

The management server 5 manages pieces of information regarding various activities on the user A in association with the status of the user A. When the management server 5 recognizes that the user A is distributing the game image and audio by streaming, the management server 5 sends the activity information associated with the streaming distribution status of the user A to the information processing device 10. This activity information includes at least information regarding distribution, for example, a game title being distributed, a period of distribution time taken so far, and the like. When the information acquiring unit 116 acquires the activity information, the information acquiring unit 116 provides the acquired information to the system image generation unit 122, and the system image generation unit 122 causes contents of the activity information to be included in the plurality of GUI elements 300.

In the embodiment, the image processing unit 130 generates a display image obtained by overlapping the system image with the game image. In another example, the image processing unit 130 may generate the display image including the system image only, without overlapping the system image with the game image.

As illustrated in FIG. 9, the GUI element 300a including at least the information regarding distribution is displayed on the menu screen. In this example, the GUI element 300a includes an elapsed time since the start of the distribution (25 minutes and 16 seconds), mode information 304a indicating the current distribution mode, and the game title 306. The microphone icon 302 represents an on-state or an off-state of distribution of the microphone audio, and the microphone icon 302 illustrated in FIG. 9 represents the on-state of distribution of the microphone audio.

While the microphone audio, the game audio, and the game image are being distributed, the accepting unit 104 accepts the operation for displaying the system image, and the distribution processing unit 156 then operates in either the first mode or the second mode as follows.

<First Mode>

In the first mode, the distribution processing unit 156 distributes not only a first standby image, instead of the game image, but also the microphone audio.

<Second Mode>

In the first mode, the distribution processing unit 156 distributes a second standby image instead of the game image and does not distribute the microphone audio.

In both the first mode and the second mode, the game image and the game audio are not distributed. Also, the camera image included in the game image is not distributed as well. The first standby image and the second standby image may be the same. However, in order to represent a difference between the two modes, it may be preferred that the first standby image and the second standby image be different from each other. The user A can select the first mode or the second mode by operating a button of the input device 6, when the streaming distribution of the game image and audio is being stopped.

During the streaming distribution, when the accepting unit 104 accepts the operation for displaying the system image, the system image generation unit 122 generates the menu image, and the image processing unit 130 displays the menu screen illustrated in FIG. 9. It is to be noted that the camera image that has been displayed before the display of the menu screen is dramatically displayed as if the camera image were drawn into the GUI element 300. Accordingly, the user A recognizes switching from the game screen to the system screen.

At this time, the distribution processing unit 156 operates in the first mode, that is, in a mode in which, while the first standby image is distributed instead of the game image, the microphone audio is also distributed but the game audio is not distributed. The microphone icon 302 illustrated in FIG. 9 indicates that the microphone audio is being distributed, and the mode information 304a represents that the standby image and the microphone audio are being distributed.

Figure 10:
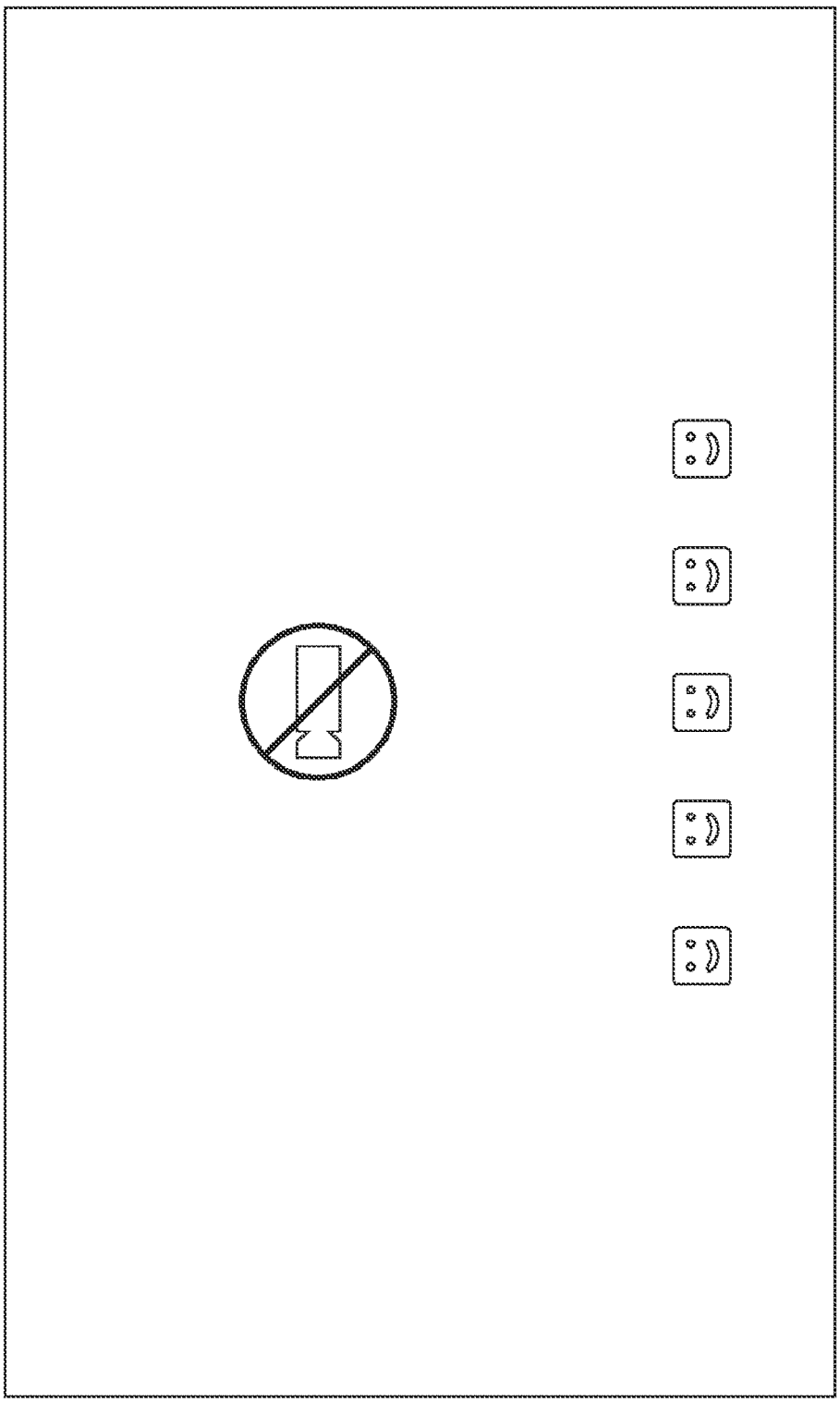
FIG. 10 is a diagram depicting an example of a screen to be displayed on an output device of each viewing user.

FIG. 10 illustrates an example of a screen to be displayed on an output device of each viewing user in the first mode. On the output device 14, the first standby image indicating that distribution of the game image and audio is temporarily stopped is displayed. The first mode is an operation mode to be used when the streaming distribution of the game image and audio is resumed immediately after the user A carries out a desired operation on the menu screen. Although the menu image cannot be distributed in terms of protection of personal information, it is set such that the microphone audio is allowed to be distributed in order to be able to notify the viewing user that the user A will resume the streaming distribution immediately.

In contrast, the user A may want to leave his/her seat for a while, keeping the distribution channel as it is, in some cases. In such a case, the second mode is used.

Below the GUI element 300a in FIG. 9, a square button to which a function of turning off distribution of the microphone audio is allocated is indicated. When the menu image illustrated in FIG. 9 is being displayed, the accepting unit 104 accepts pressing operation of the square button, that is, an operation for switching to the second mode, the distribution processing unit 156 operates in the second mode. Specifically, the distribution processing unit 156 operates in the mode of distributing the second standby image but not distributing the microphone audio and the game audio.

FIG. 11 illustrates an example of a screen to be displayed on the output device of each viewing user in the second mode. On the output device 14, the second standby image for giving an explanation that distribution of the game image and audio is stopped and the microphone of the distributer is turned off is displayed. The viewing user recognizes that the distribution user A takes a rest or the like, since the voice from the distribution user A is muted. Note that the viewing user A may be able to freely customize the second standby image.

Figure 12:
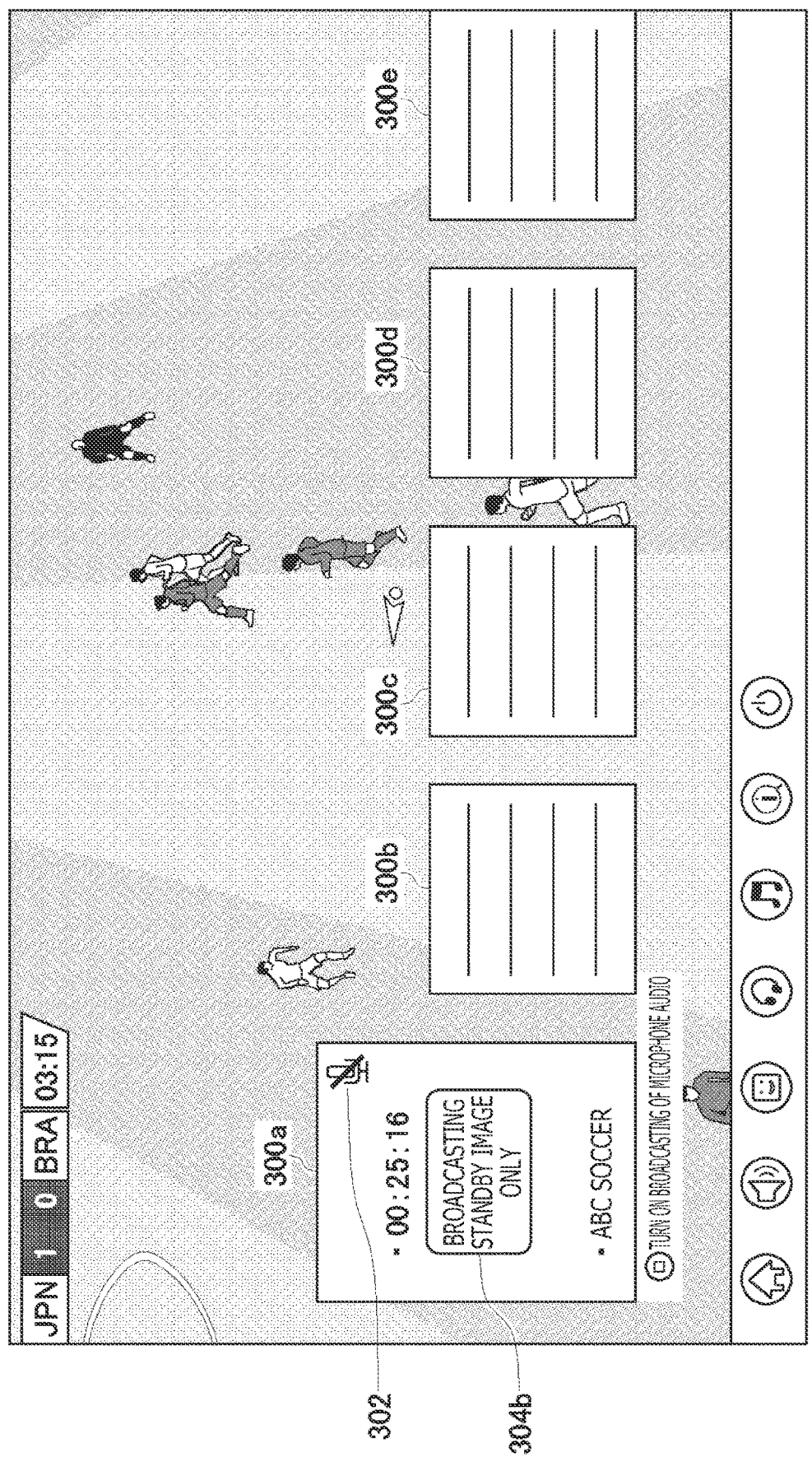
FIG. 12 is a diagram depicting an example of a screen to be displayed on an output device of a distribution user.

FIG. 12 illustrates an example of a screen to be displayed on the output device of the distribution user in the second mode. In the GUI element 300a, the microphone icon 302 illustrated in FIG. 12 indicates that the microphone audio is not distributed, and the mode information 304b represents that only the standby image is being distributed.

Below the GUI element 300a in FIG. 12, the square button to which a function of turning on distribution of the microphone audio is allocated is indicated. When the menu image illustrated in FIG. 12 is being displayed, the accepting unit 104 accepts pressing operation of the square button, that is, an operation for switching to the first mode, the distribution processing unit 156 operates in the first mode, that is, in a mode of distributing the first standby image and the microphone audio.

Note that, when the user A operates a predetermined button (HOME button) of the input device 6 on the menu screen illustrated in FIG. 12, the accepting unit 104 accepts the operation as an operation for turning off display of the system image, and the system image generation unit 122 ends generation of the system image. Hence, the image processing unit 130 ends the merging process of the system image and the game image and generates a display image (see FIG. 8) including the game image and the camera image. Suppose that there is a condition that the HOME button is required to be operated during display of the menu screen in the first mode in order to resume the streaming distribution. Under such a condition, even if the HOME button is operated during display of the menu screen in the second mode, the streaming distribution cannot be resumed. In view of this, the image processing unit 130 may display a message indicating that the streaming distribution has not been able to be resumed yet, in such a manner as to overlap the message with the display image.

The present invention has been described above on the basis of embodiment thereof. The foregoing embodiment is illustrative, and it is to be understood by those skilled in the art that combinations of constituent elements and processing processes of the embodiment are susceptible of various modifications and that such modifications also fall within the scope of the present invention.

INDUSTRIAL APPLICABILITY

The present invention is applicable to the technical field regarding distribution of an image.

REFERENCE SIGNS LIST

1: Image sharing system
10: Information processing device
11: Shared server
100: Processing unit
102: Communication unit
104: Accepting unit
110: Execution unit
112: Game image generation unit
114: Game audio generation unit
116: Information acquiring unit
118: Camera image supplying unit
120: Setting unit
122: System image generation unit
124: Audio supplying unit
130: Image processing unit
132: Audio providing unit
140: Frame buffer unit
142: Game buffer
144: System buffer
150: Sharing processing unit
152: Image acquiring unit
154: Audio acquiring unit
156: Distribution processing unit
158: Setting image generation unit

The invention claimed is:

1. An information processing device comprising circuitry configured to:
   generate a game image;
   generate a game audio;
   acquire a microphone audio input to a microphone;
   distribute the microphone audio, the game audio, and the game image; and
   accept an operation made by a user, wherein,
      during distribution of the microphone audio, the game audio, and the game image, after accepting a predetermined operation, the information processing device operates in either a first mode in which a first standby image is distributed and the microphone audio is distributed as well or a second mode in which a second standby image is distributed but the microphone audio is not distributed.

2. The information processing device according to claim 1, wherein the first standby image and the second standby image are different from each other.

3. The information processing device according to claim 1, wherein the circuitry is further configured to:
   generate a display image including at least information regarding distribution, and;
   accept a display operation of a system image that is different from the game image, wherein,
      during distribution of the microphone audio, the game audio, and the game image, when accepting the display operation of the system image, the information processing device operates in the first mode to distribute the first standby image and the microphone audio.

4. The information processing device according to claim 3, wherein, when an output device displays the display image including at least the information regarding the distribution and the information processing device accepts a switching operation to the second mode, the information processing device operates in the second mode to distribute the second standby image.

5. An image distribution method comprising:
   generating a game image;
   generating a game audio;
   acquiring a microphone audio input to a microphone;
   distributing the microphone audio, the game audio, and the game image;
   accepting a predetermined operation during the distribution of the microphone audio, the game audio, and the game image; and
   executing, after the predetermined operation is accepted, either a first mode in which a first standby image is distributed and the microphone audio is distributed as well or a second mode in which a second standby image is distributed but the microphone audio is not distributed.

6. A non-transitory, computer readable storage medium containing a program, which when executed by a computer, causes the computer to perform an image distribution method by carrying out actions, comprising:
   generating a game image;
   generating a game audio;
   acquiring a microphone audio input to a microphone;
   distributing the microphone audio, the game audio, and the game image;
   accepting a predetermined operation during the distribution of the microphone audio, the game audio, and the game image; and
   executing, after the predetermined operation is accepted, either a first mode in which a first standby image is distributed and the microphone audio is distributed as well or a second mode in which a second standby image is distributed but the microphone audio is not distributed.

* * * * *